United States Patent [19]
Satake et al.

[11] Patent Number: 5,798,466
[45] Date of Patent: Aug. 25, 1998

[54] FLOW METER AND METHOD OF CALIBRATING SAME

[75] Inventors: Satoru Satake, Tokyo; Yoshimasa Tomoyasu, Hiroshima, both of Japan

[73] Assignee: Satake Corporation, Tokyo, Japan

[21] Appl. No.: 780,738

[22] Filed: Jan. 8, 1997

[30] Foreign Application Priority Data

Jan. 26, 1996 [JP] Japan ................... 8-032885

[51] Int. Cl.$^6$ .................................................. G01F 1/30
[52] U.S. Cl. ............................................... 73/861.73
[58] Field of Search ................... 73/3, 861.73, 861.74, 73/861.75, 861.76, 215

[56] References Cited

U.S. PATENT DOCUMENTS

| | | | |
|---|---|---|---|
| 3,611,803 | 10/1971 | Kajiura et al. | 73/861.73 |
| 4,440,029 | 4/1984 | Tomiyasu et al. | 73/861.73 |
| 4,768,387 | 9/1988 | Kemp et al. | |
| 4,926,903 | 5/1990 | Kawai | 73/861.75 |
| 4,931,776 | 6/1990 | Klos et al. | 73/861.74 |
| 5,065,632 | 11/1991 | Reuter. | |
| 5,369,603 | 11/1994 | Myers. | |
| 5,594,667 | 1/1997 | Myers. | |

FOREIGN PATENT DOCUMENTS

| | | | |
|---|---|---|---|
| 43 23 305 A 1 | 1/1994 | Germany | G01D 1/02 |
| 43 23 968 A 1 | 1/1994 | Germany | G01D 1/00 |
| 57-189013 | 11/1982 | Japan. | |
| 63-195524 | 8/1988 | Japan. | |
| 1-105120 | 4/1989 | Japan. | |
| 3-500812 | 2/1991 | Japan. | |
| 6-511558 | 12/1994 | Japan. | |
| 8-014962 | 1/1996 | Japan. | |
| WO 93/22633 | 1/1993 | WIPO | G01G 11/04 |
| WO 93/22652 | 11/1993 | WIPO | G01N 15/02 |

Primary Examiner—George M. Dombroske
Assistant Examiner—Jewel V. Artis
Attorney, Agent, or Firm—Darby & Darby

[57] ABSTRACT

By a load detector, a magnitude of a dynamic load, depending on a downward-flow impact of a particulate material flowing through a flow passage, is measured, and also a magnitude of a static load, corresponding to a total amount of the particulate material flown through a predetermined position for a predetermined time period, is measured. A value of a dynamic load-type flow rate of the particulate material, corresponding to a measured value of the dynamic load, is calculated from the measured value of the dynamic load by a first calculation formula, and also a value of an actual flow rate of the particulate material is calculated from a measured value of the static load during the predetermined time period by a second calculation formula. A correction factor for bringing the dynamic load-type flow rate value, depending on the difference of the particulate materials, into agreement with the actual flow rate value is found. The first calculation formula is corrected by the correction factor, and a corrected dynamic load-type flow rate value is calculated from the measured dynamic load value by the use of the corrected first calculation formula. With this construction, there can be obtained a flow meter in which the correction of the flow rate of the flow meter or calibration of the flow meter can be effected easily.

9 Claims, 12 Drawing Sheets

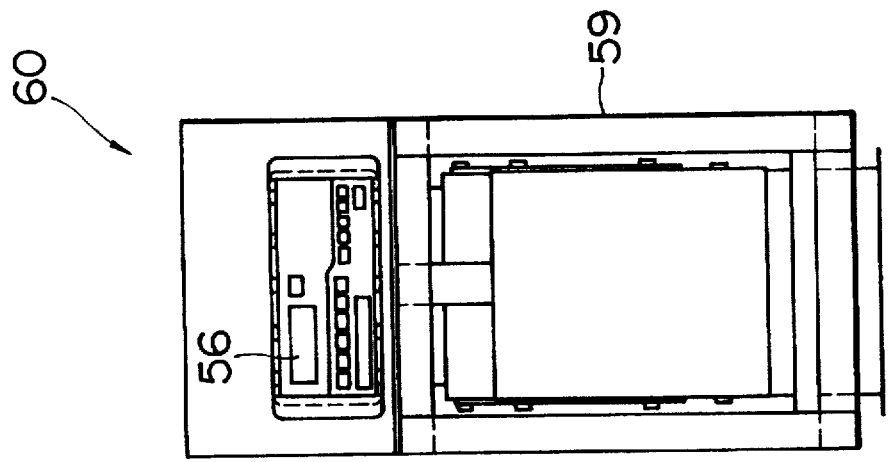
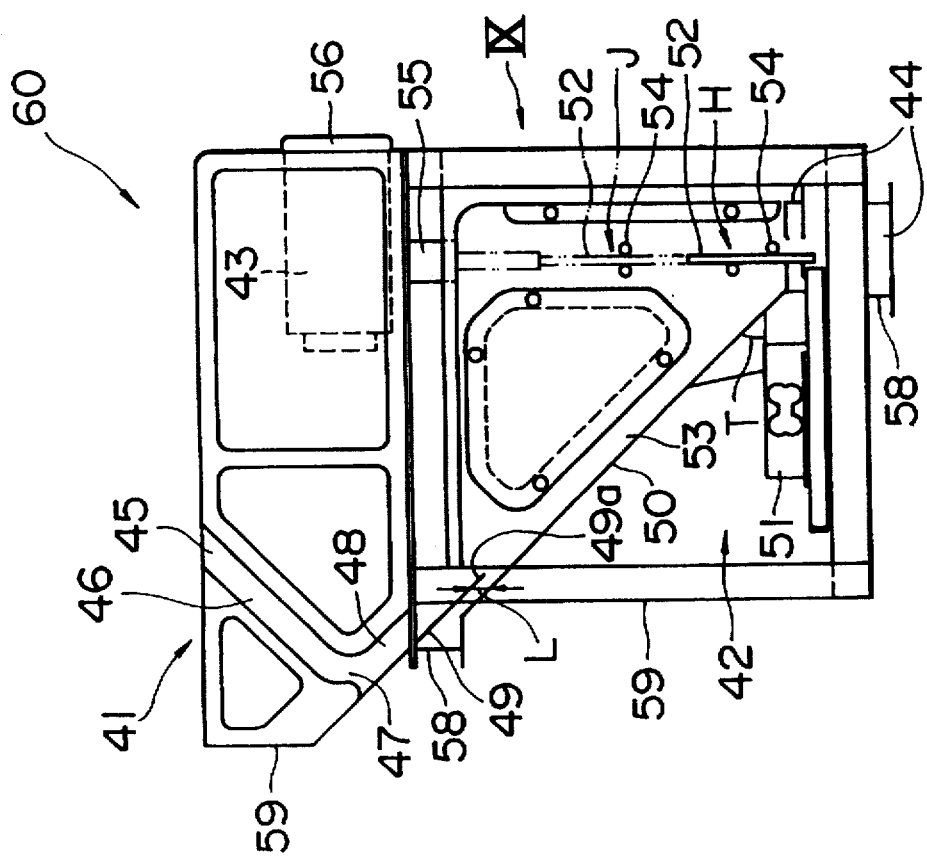

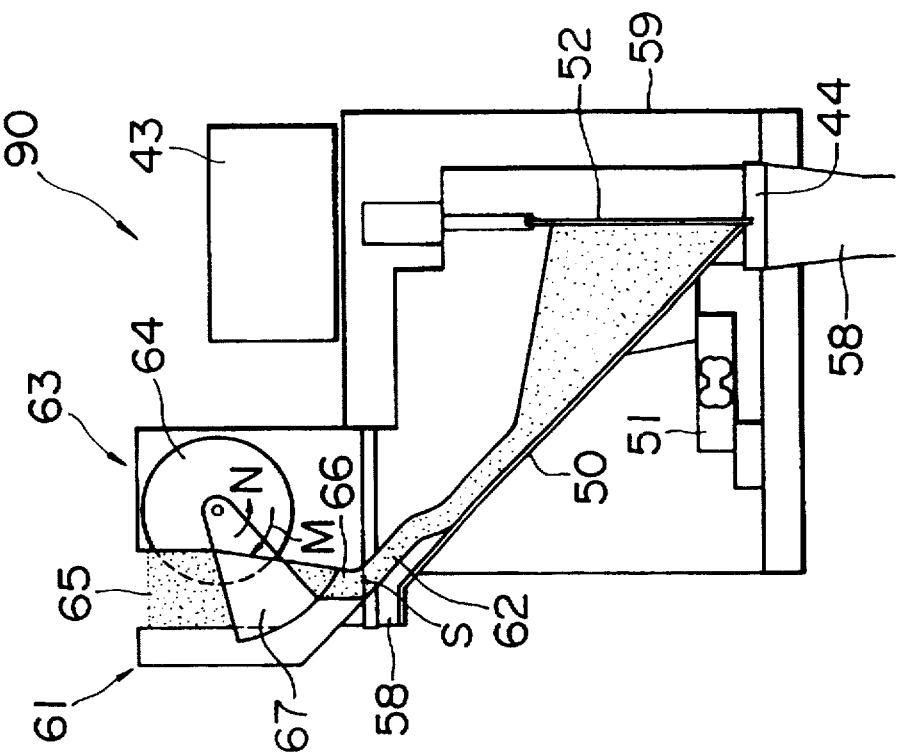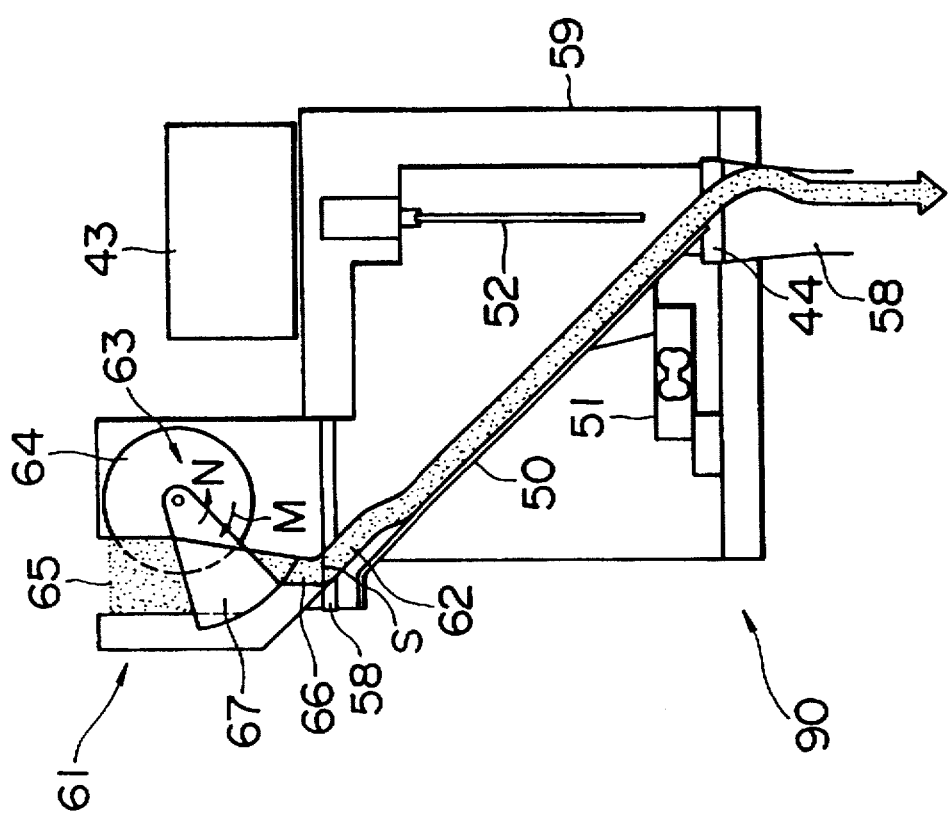

FLOW METER AND METHOD OF CALIBRATING SAME

BACKGROUND OF THE INVENTION

1. Field of the Invention

This invention relates to a flow meter for measuring the flow rate of a particulate material flowing continuously through a flow passage, and also relates to a method of calibrating the flow meter.

The term "particulate material" means herein grains or particles which can flow substantially continuously, and examples thereof include not only grains of wheat and rice and grain powder such as wheat powder or flour, but also particles which vary in characteristics (such as a specific gravity), depending on external conditions such as an environmental condition and a production condition, and particles different in average size of the particles, and the size of the particles or grains is not limited.

2. Description of the Related Art

In a plant for processing cereal such as rice and wheat, the amount of processing of the grains is measured in terms of a flow rate. Herein, "the flow rate of the particulate material" means the weight of the particulate material flowing per unit period of time. In order to continuously measure the flow rate of a continuously-flowing particulate material, there is used an impact load detection-type or impact-type flow meter in which the particulate material is received by an impact-receiving detection plate (impact-receiving plate-like member), and its impact load on the plate is measured, and this impact load is converted into the flow rate.

In this impact flow meter, however, a downward-flow impact, applied by the particulate material to the impact-receiving detection plate, varies depending on the nature or characteristics of the particulate material, such as its bulk specific gravity, water content and temperature. When the flow rate is measured only for the raw grains of the same kind in the same condition, this variation does not cause substantial problem. Actually, however, it is seldom that the environment for raw materials is in good order, and in most cases the flow rate of various kinds of grains must be measured. And besides, even grains of the same kind often varies in water content, depending on various conditions the grains have been subjected to. Therefore, in a processing plant or facility where various kinds of grains were processed, much time was required for calibrating the flow meter or correcting the indication of the flow rate in the flow meter. The term "correcting the flow rate" and "correction of flow rate" in or of the flow meter mean herein "correcting the indication of the flow rate" and "correction of the indication of the flow rate" in or of the flow meter, i.e. "calibrating the flow meter" or "calibration of the flow meter".

In the correction (of the indication) of the flow rate in the impact flow meter, usually, a certain amount of grains are extracted or sampled from a flow of the grains (to be measured) for a predetermined period of time, and an actual flow rate is calculated from the weight of the grains thus extracted for the predetermined time period, and the correction of the flow rate or calibration is effected according to this actual flow rate value. Most of these correction or calibration operations are carried out manually. If trying to accurately effect the correction of the flow rate or calibration for each of many flow meters installed in one processing facility, much time (for example, one to two days) is often required for this correction or calibration operation. If trying to keep the labor, required for the correction or calibration operation, to a minimum, the correction of the flow rate or the calibration is omitted when the raw grains are similar to the grains of the preceding lot, and as a result the accuracy of the value of the flow rate measured by the flow meter is lowered.

There are known the type of flow meters which comprise a load-receiving plate-like member provided in an inclined manner in a flow passage of a particulate material—the term "particulate material", here in the Description of the Related Art, is not limited to the material with properties or nature easily changed or varied in specific gravity etc. depending on environmental conditions, but means broadly any particulate materials of a medium or a small particle size, and powders—for receiving a dynamic load corresponding to the flow rate of the particulate material flowing through the flow passage, a load detector for detecting a magnitude of the load received by the load-receiving plate-like member, and an arithmetic and control unit having a dynamic load-type flow rate calculation means for calculating a "dynamic load-type flow rate" (defined later in this specification) from a measured value of the load detector obtained during a period when the particulate material is flowing through the flow passage. Such flow meters are disclosed, for example, in Japanese Patent Unexamined Publication No. 1-105120 (A) (convention priority of U. S. patent application Ser. No. 07/049,666 filed May 13, 1987 being claimed), Japanese Patent Unexamined Publication No. 63-195524 (A), U.S. Pat. No. 5,065,632, Japanese Patent Unexamined Publication Nos. 8-14962 (A) and 57-189013 (A), and WO-A-93-22,633.

Among the above prior art references, Japanese Patent Unexamined Publication No. 1-105120 (A), U.S. Pat. No. 5,065,632 and Japanese Patent Unexamined Publication No. 8-14962 (A) disclose a typical impact detection-type flow meter in which the load-receiving plate-like member receives a downward-flow impact of the particulate material falling a substantial distance.

On the other hand, among the above prior art references, Japanese Patent Unexamined Publication No. 63-195524 (A) and Japanese Patent Laid-Open Specification No. 6-511558 (A) corresponding to WO-A-93-22,633 disclose a structure in which the load-receiving plate-like member receives a relatively small downward-flow impact of the particulate material falling a relatively small distance from an upstream-side slanting surface, and also the load-receiving plate-like member supports the particulate material so that the particulate material can flow down over an upper surface of this plate-like member, and the total load (hereinafter referred to as "dynamic load"), which the plate-like member receives, is the sum of the two (that is, the downward-flow impact and the load of the particulate material flowing down over the upper surface of the plate-like member).

In this specification, the term "dynamic load" means the total load including a load applied by the flowing particulate material to the load detector, and it may include, as a part thereof, a static load due to the weight of particulate material being flown with proviso that the static load of the particulate material, deposited or accumulated in a non-flowing condition on the plate-like member, is not included in the dynamic load.

Japanese Patent Unexamined Publication No. 1-105120, corresponding to U.S. patent application Ser. No. 07/049, 666, discloses an impact flow meter in which a downward-flow impact is detected as the dynamic load, and its output span is adjusted or corrected.

More specifically, Japanese Patent Unexamined Publication No. 1-105120 discloses an impact flow meter 120 as shown in FIG. 15. The impact flow meter 120 comprises a cylindrical housing 123, having a downstream end opening 121 at its lower end and a side opening in which a particulate material inflow tube 122 is inserted, an impact-receiving plate 124 for receiving a downward-flow impact of a particulate material flowing through the inflow tube 122, and a strain gauge unit (serving as a load detector) 125 which is suspendedly mounted at its upper end on an inner peripheral surface of the housing 123, and supports the impact-receiving plate 124 at its lower end in a suspended manner. The strain gauge unit 125 detects a horizontal component force of the downward-flow impact, received by the impact-receiving plate 124, as an impact load. The impact flow meter 120 further comprises a calibration weight 127 which is connected to an outer surface of the impact-receiving plate 124 through a cable 126 if necessary. This calibration weight 127 is used for adjusting the span of an amplifier constituting the load detector.

However, in this case, also, in order to determine whether or not the value of the actual flow rate, obtained by converting the detected load of the impact-receiving plate 124, is correct, it is necessary "to check the calibration by passing the flow material at a known flow rate through the flow meter".

SUMMARY OF THE INVENTION

With the above problems in view, it is an object of this invention to provide a flow meter in which a flow rate (indication) can be easily corrected or calibrated, and also to provide a method of or calibrating the flow meter or correcting (an indication of) the flow rate measured by the flow meter.

Another object of the invention is to provide a flow meter in which less time and labor are required for the correction thereof or for the correction (of the indication) of the flow rate thereby, and also to provide a method of or calibrating the flow meter or correcting (the indication of) the flow rate measured by the flow meter.

A further object of the invention is to provide a flow meter capable of accurately measuring a flow rate in accordance with a change of raw particulate materials, and also to provide a method of calibrating the flow meter or correcting (the indication of) the flow rate measured by this flow meter.

A still further object of the invention is to provide a flow meter in which each time before measurement of a flow rate of a particulate material of different nature or characteristics is started, calibration thereof or correction (of the indication) of the flow rate thereby is substantially or automatically carried out, and also to provide a method of correcting the flow meter or calibrating (the indication of) the flow rate measured by the flow meter.

To achieve at least a part of the above objects, according to a first aspect of the invention, there is provided a flow meter comprising:
  a tubular member forming a flow passage for a particulate material;
  an opening-closing valve member connected to the tubular member so as to open and close a downstream end opening of the tubular member, the opening-closing valve member being adapted to receive a dynamic load corresponding to a flow rate of the particulate material, flowing through the flow passage, when the opening-closing valve member is in its open position to open the downstream end opening of the tubular member; and
  a load detector for detecting a load acting on the opening-closing valve member; wherein the flow meter further comprising:
  an arithmetic and control unit including:
  dynamic load-type flow rate calculation means for finding or calculating a dynamic load-type flow rate of the particulate material from a measured value of the load detector when the opening-closing valve member allows the flow of the particulate material, so that the particulate material is flowing through the flow passage;
  actual flow rate calculation means for finding or calculating an actual flow rate of the particulate material based on a measured value of the load detector, representing a static load of the particulate material deposited or accumulated within the tubular member for a predetermined time period after the flow of the particulate material is interrupted or blocked by the opening-closing valve member, and a value of the predetermined time period; and
  means for finding or obtaining or calculating a correction factor for correcting the dynamic loadtype flow rate value into the actual flow rate value.

To achieve at least a part of the above objects, according to a second aspect of the invention, there is provided a flow meter comprising:
  a load-receiving plate-like member provided or disposed in an inclined or oblique manner in a flow passage for a particulate material, the load-receiving plate-like member being adapted to receive a dynamic load corresponding to a flow rate of the particulate material flowing through the flow passage;
  a load detector for detecting a magnitude of a load acting on the load-receiving plate-like member; and
  a weir or stop or block member movable between a block position where the weir member blocks the flow of the particulate material at a position downstream of the load-receiving plate-like member and an open position where the weir member allows the flow of the particulate material; wherein the flow meter further comprising:
  an arithmetic and control unit including:
  dynamic load-type flow rate calculation means for finding or calculating a dynamic load-type flow rate of the particulate material from a measured value of the load detector when the weir member allows the flow of the particulate material so that the particulate material is flowing through the flow passage;
  actual flow rate calculation means for finding or calculating an actual flow rate of the particulate material based on a measured value of the load detector, representing a static load of the particulate material deposited or accumulated on the load-receiving plate-like member for a predetermined time period after the weir member is set to the block position, and a value of the predetermined time period; and
  means for finding or calculating a correction factor for correcting the dynamic load-type flow rate to the actual flow rate.

In either of the above two flow meters, preferably, the load detector has a range for detecting the dynamic load of the particulate material, and a range for detecting the static load or weight of the particulate material.

In a flow meter system comprising a plurality of flow meters of either or both of the above two types, preferably, the arithmetic and control unit of each of the plurality of flow meters has a normal operating mode for finding or obtaining the dynamic load-type flow rate, and a correction or calibration mode for finding or obtaining the correction factor, and the arithmetic and control units are connected to a centralized control unit which controls the arithmetic and control units in a centralized manner, and when raw material of the particulate material flowing through the flow passage in at least one of the flow meters is changed to a different one (for example, the lot of particulate material is changed), the centralized control unit feeds or supplies to the at least one flow meter a control signal so as to change the associated arithmetic and control unit from the normal operating mode to the correction mode.

To achieve at least a part of the above object, according to a third aspect of the invention, there is provided a method of calibrating a flow meter comprising the steps of:

measuring, by a load detector, a magnitude of a dynamic load, depending on a downward-flow impact of a particulate material flowing through a flow passage, and a magnitude of a static load corresponding to a total amount of the particulate material having been deposited or accumulated at a block position in a predetermined time period after the flow of the particulate material is blocked;

finding or calculating a value of a dynamic load-type flow rate of the particulate material, corresponding to a measured value of the dynamic load, from the measured value of the dynamic load by a first calculation formula, and also finding or calculating a value of an actual flow rate of the particulate material from a measured value of the static load in the pre-determined time period by a second calculation formula;

finding or obtaining a correction factor for bringing the dynamic load-type flow rate value, depending on difference of the particulate materials, into agreement with the actual flow rate value; and correcting the first calculation formula by the correction factor, and finding or calculating a corrected dynamic load-type flow rate value from the measured dynamic load value by the corrected first calculation formula.

Preferably, the above flow meter calibration method comprises the steps of:

forming the flow passage in a tubular member;

connecting an opening-closing valve member, which opens and closes a downstream end opening of the tubular member, to the tubular member;

detecting, by the load detector, the dynamic load represented by the downward-flow impact applied to the opening-closing valve member from the particulate material flowing through the flow passage in an open condition of the opening-closing valve member, the load detector being coupled to the tubular member connected to the opening-closing member; and detecting, by the load detector, the static load represented by the load corresponding to the total amount of the particulate material deposited within the tubular member during the predetermined time period when the opening-closing valve member is set at its closing or blocking position.

Alternatively, the above flow meter correction method comprises the steps of:

providing a load-receiving plate-like member in an inclined or oblique manner in the flow passage;

providing a weir or block member at a downstream portion of the load-receiving plate-like member, the weir member being movable between a block position where the weir member blocks the flow of the particulate material at a position downstream of the load-receiving plate-like member and an open position where the weir member allows the flow of the particulate material;

measuring, by the load detector, the static load representing the weight of the particulate material having been deposited on the load-receiving plate-like member in the predetermined time period after the weir member is set to the block position; and setting the weir member to the open position, and measuring, by the load detector, the dynamic load during the time when the particulate material is flowing through the flow passage.

Since, in the flow meter calibration method of the invention, by the load detector, a magnitude of the dynamic load, depending on the downward-flow impact of the particulate material flowing through the flow passage, is measured, and also a magnitude of the static load, corresponding to the total amount of the particulate material having been flown through a predetermined position during a predetermined time period, is measured, and since a value of the dynamic load-type flow rate of the particulate material, corresponding to a measured value of the dynamic load, is calculated from the measured value of the dynamic load by the first calculation formula, and also a value of an actual flow rate of the particulate material is calculated from a measured value of the static load during the predetermined time period by the second calculation formula, it is possible to obtain, with respect to the actually-flowing particulate material, both of the dynamic load-type flow rate value, based on the measured value of the dynamic load depending on the downward-flow impact, and the actual flow rate value, and therefore it can be easily judged, whether or not the dynamic load-type flow rate value is accurate, by comparing it with the actual flow rate value.

In the flow meter-calibration method of the invention, since the correction factor for bringing the dynamic load-type flow rate value, depending on the difference of the particulate materials, into agreement with the actual flow rate value is calculated, and the first calculation formula is corrected by the correction factor, and the corrected dynamic load-type flow rate value is calculated from the measured dynamic load value by the corrected first calculation formula, following advantageous effects can be obtained; if the dynamic load-type flow rate value deviates from the actual flow rate value, the first calculation formula is corrected so as to give a dynamic load-type flow rate-indicating value in agreement with the actual flow rate value, and by doing so, the calibration of the flow meter can be effected easily. Therefore, for example, when the lot of particulate material whose flow rate is to be measured is changed, so that a new particulate material, having a different nature, begins to flow through the flow passage, the correction of the flow rate of the flow meter or calibration thereof can be automatically effected in a short time. As a result, it becomes substantially unnecessary the correcting operation, which has been conventionally effected manually beforehand by the operator for each flow meter.

As a matter of course, it is not necessary to measure or detect the actual flow rate constantly, but this is effected only when the correction of the flow rate or calibration becomes necessary. For example, this is effected twice a day, or when the raw material of the particulate material is changed, i.e. the particulate material of different origin is flown. Therefore, although the flow of the particulate material through the flow passage is interrupted when measuring the actual flow rate by a kind of batch process for the purpose of the correction, the time period of this interruption is short, and only temporary, and therefore the overall processing will not be affected significantly.

Since the first type of flow meter of the invention comprises the tubular member forming the flow passage for the particulate material, the opening closing valve member, which is connected to the tubular member so as to open and close the downstream end opening of the tubular member, and receives a dynamic load corresponding to the flow rate of the particulate material, flowing through the flow passage, when the opening-closing valve member is in its open position to open the downstream end opening of the tubular member, and the load detector for detecting the total load acting on the tubular member, it is possible to detect, by one load detector the dynamic load and the static load or weight (of the particulate material deposited within the tubular member for a predetermined time period after the flow of the particulate material is interrupted by the opening-closing valve member), in the same flow meter structure having the opening-closing valve member at the tubular member. Therefore, this flow meter can be simple in structure or construction although it has the calibration function of correcting the flow rate value.

In the flow meter of the invention, a dynamic load-type flow rate value, calculated by the dynamic load-type flow rate calculation means from a value of the load detector measured when the opening-closing valve member allows the flow of the particulate material so that the particulate material is flowing through the flow passage, is brought into agreement with the actual flow rate value which is obtained by the actual flow rate calculation means based on a measured value of the load detector, representing the static load or weight, and a value of the predetermined time period. Namely, if there is any difference between the two values, a correction factor for correcting the dynamic load-type flow rate value in such a manner as to eliminate the difference is obtained by the correction means, and the thus obtained correction factor is used for correcting the calculation of the dynamic load-type flow rate.

Here, if a term or a factor, to be corrected, of the calculation formula of the dynamic load-type flow rate calculation means are beforehand determined, the correction can be effected easily. Therefore, when the actual flow rate or the static load or weight corresponding to the actual flow rate is measured, the correction processing is effected promptly. This correction can be processed by the arithmetic and control unit without requiring any substantial manual labor or operation, and therefore can be completed in a very short time.

It will be readily appreciated that, in the second type of flow meter of the present invention, the calibration thereof or the correction of the flow rate can be made similarly to that described above with respect to the first type of flow meter.

In the flow meter of the invention, preferably, the load detector has the range for detecting the dynamic load of the particulate material, and the range for detecting the static load of the particulate material. Therefore, in accordance with a magnitude of the load, the load can be always measured with the full range, and hence the accurate measurement can be effected.

For example, in the first type of flow meter, it has been experimentally confirmed that the ratio between the dynamic load (composed mainly of the impact load) and the batch load is about 1:100, and that it is sufficient that the full range of the indication value of the load detector is set to about 1:100 in view of a resolution of the load cell etc. serving as the load detector. For example, when the flow rate was 5 tons/hour (where 1 ton=1,000 kilograms), a dynamic load was about 150 g, whereas a static load or weight of rice grains as the particulate material, deposited or accumulated for 10 seconds (This will be hereinafter referred to as "batch load for ten seconds"), was about 14 kg. Therefore, by switching the range, the loads different in the ratio of 1:100 can be detected with the same precision (in terms of the number of effective digits or figures). It will be readily appreciated that by using the load detector such as a load cell with the full range, the accurate measurement can be achieved. In this example, actually, the dynamic load was measured with a load detection range whose full range was 200 g, and the batch load was measured with a load detection range whose full range was 20 kg.

In the second type of flow meter of the invention, the magnitude of the impact load is relatively small. In this case, however, the ratio of the range may be, for example, about 1:100 if an additional static load is considered.

In the flow meter system comprising a plurality of flow meters of the invention, preferably, the arithmetic and control unit of each of the plurality of flow meters has the normal operating mode for obtaining or finding the dynamic load-type flow rate, and the correction mode for obtaining or finding the correction factor, and the arithmetic and control units are connected to the centralized control unit which controls the arithmetic and control units in a centralized manner, and when the particulate material to be flown through the flow passage in at least one of the flow meters is changed to a different one, the centralized control unit supplies to the at least one flow meter a control signal so as to change the associated arithmetic and control unit from the normal operating mode to the correction mode. Therefore, there is no need to effect the correction operation by manually operating the corresponding flow meter each time the particulate material to be flown is changed to a different one. And besides, since the correction can be effected easily in a short time, the correction can be effected at least each time the particulate material to be flown is changed to a different one, and therefore the flow rate can always be measured correctly by all the flow meters in the system. Even when the particulate material to be flown is not changed to a different one, the flow rate (indication) correction of the flow meter or calibration thereof may be periodically effected in view of a change of environmental conditions and others.

The foregoing and other objects, features and advantages of the invention will be made clearer hereafter from the description of preferred embodiments of the invention referring to attached drawings.

BRIEF DESCRIPTION OF THE DRAWINGS

FIG. 8 is a side view of a flow meter of a second preferred embodiment according to the invention;

FIG. 9 is a front-elevational view of the flow meter of FIG. 8 as seen in a direction IX of FIG. 8;

FIG. 10 is a view of a modification of the flow meter of FIG. 8, showing a condition in which a particulate material is flowing through the flow meter;

FIG. 11 is an explanatory view showing a condition in which the flow of the particulate material is interrupted in the flow meter of FIG. 10;

DESCRIPTION OF THE PREFERRED EMBODIMENTS

A flow meter according to a first preferred embodiment of the invention will now be described with reference to FIGS. 1 to 7.

Figure 1:
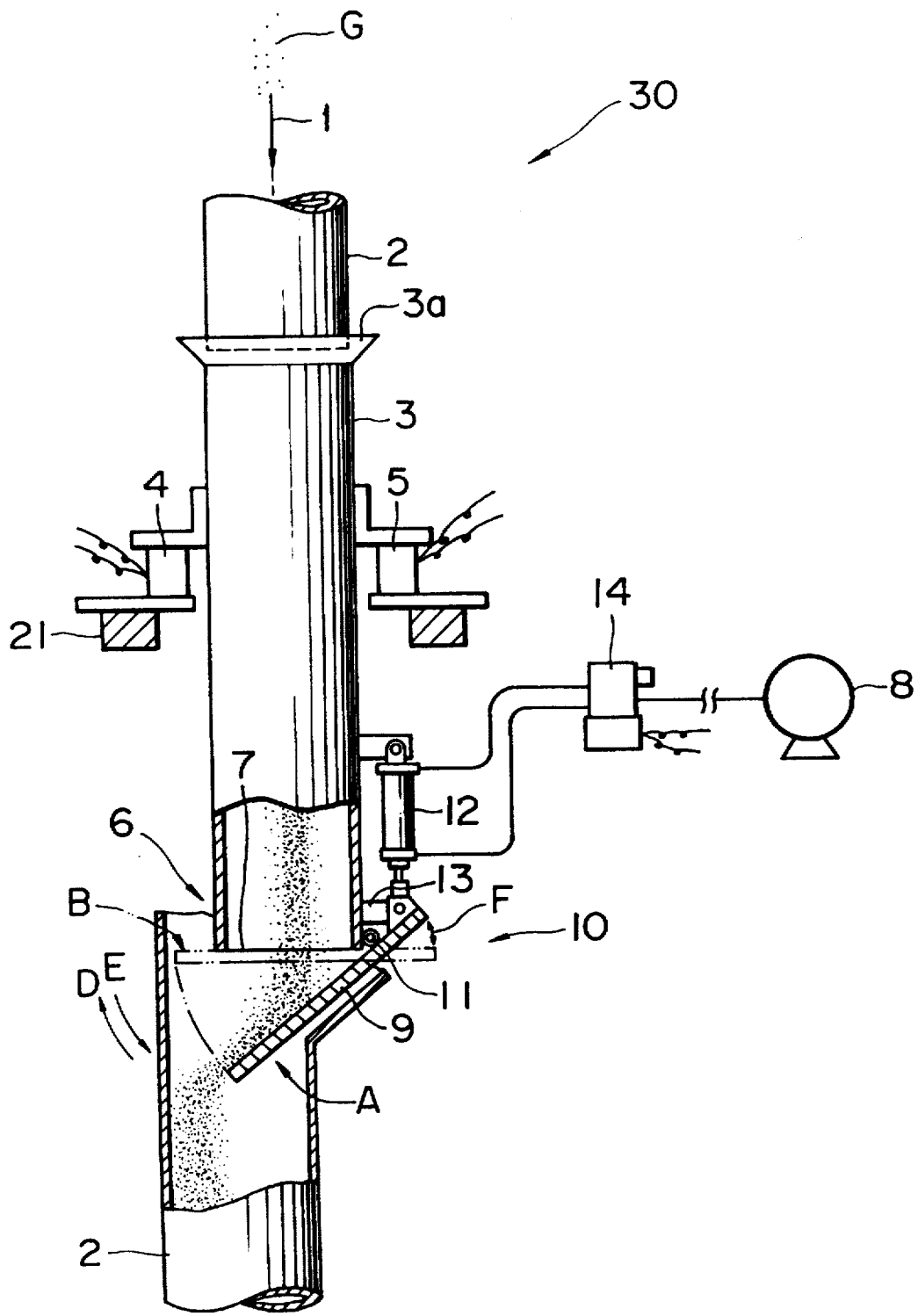
FIG. 1 is a partly-broken, front-elevational view of a flow meter, according to one preferred embodiment of the present invention, in a state for measuring a dynamic load-type flow rate.

In FIG. 1 showing a main portion of the flow meter 30, a vertically-extending, tubular member 3 of a desired length is supported, to be located below a lower end or downstream end of a stationary conduit 2 forming a flow passage 1 for a particulate material G, by a stationary frame 21 of the flow meter 30 through load cells 4 and 5 serving as a load detector. A funnel-like reception portion 3a is formed at an upper end or upstream end of the tubular member 3.

A movable valve device 10 in the form of a shut-off valve serving as an opening-closing valve is provided at a downstream end or discharge-side end 6 of the tubular member 3, and is operable to open and close a downstream end opening 7 at the downstream end of the tubular member 3. The movable valve device 10 includes an opening-closing valve member 9 pivotally movable about a pivot shaft 11 in directions D and E between a closing position B (see FIG. 2) where the valve member 9 closes the downstream end opening 7 to shut off the flow passage 1 and an open position A (see FIG. 1) where the valve member 9 opens the downstream end opening 7 to open the flow passage 1. During a period of time when the opening-closing valve member 9 is held in the closing position B, the particulate material G is continuously deposited or accumulated on the opening closing valve member 9 within the tubular member 3. On the other hand, the opening-closing valve member 9, when held in the open position A, is inclined, that is, disposed obliquely generally across the flow passage 1 as shown in FIG. 1, and therefore when the opening closing valve member 9 is in the open position A, a downward-flow impact load of the particulate material G is continuously or constantly applied to the opening-closing valve member 9. In so far as the opening-closing valve member 9 can be located in the open position A and the closing position B, the manner of movement of this valve member 9 intermediate the two positions A and B, as well as the manner of supporting this valve member 9, may be different from the above manner. Further, in so far as the downward-flow impact load, received by the opening-closing valve member 9 in its open position A, can be detected by the load cells 4 and 5 as the load detector, the tubular member 3 may be inclined instead of extending in the vertical direction, and also may be curved at its lower end portion instead of being straight. In so far as the load detector (load cells 4 and 5) can detect the total load applied to the tubular member 3 in the vertical direction, their detection principle and structure may be any suitable ones. The load detector may be constituted by the single load cell instead of plural load cells if appropriate arrangement of the associated members is taken for detecting the load thereon.

The opening-closing valve member 9 is driven by drive means 12, such as a pneumatic cylinder, to be moved or displaced in the directions D and E between the open position A and the closing position B. A stopper or spacer 13 supports the opening-closing valve member 9 at its open position A, and when the opening-closing valve member 9 is opened through a desired angle F to the open position A, the stopper or spacer 13 supports the valve member 9 so that the valve member 9 can be maintained in the open position A against the downward-flow impact load of the particulate material G. The stopper or spacer 13 may be provided with a cushioning or shock-absorbing material.

Figure 3:
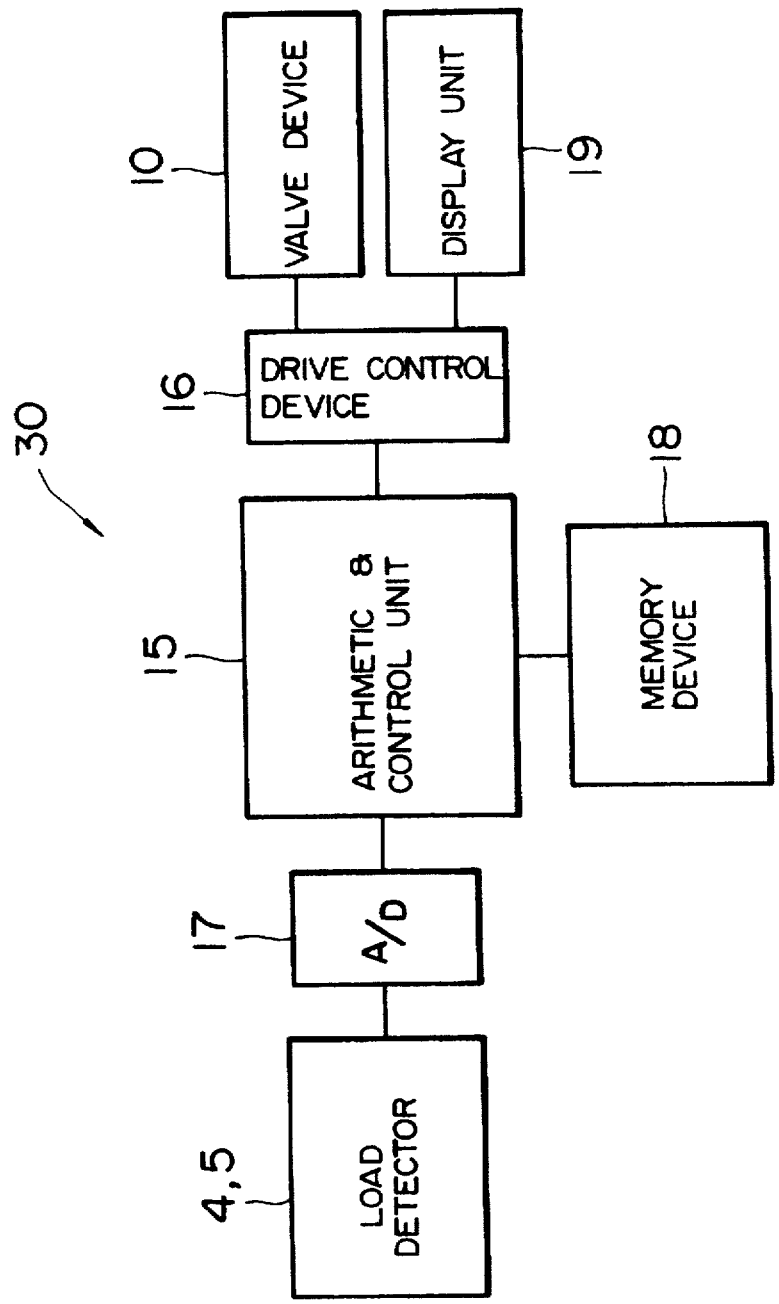
FIG. 3 is a block diagram of a flow rate measurement and correction control system of the flow meter of FIG. 1.

A solenoid valve 14 controls to drive the pneumatic cylinder 12 by means of compressed or pressurized air. The solenoid valve 14, constituting a part of the movable valve device 10, is connected to a drive control device 16 which delivers, in response to an output signal of an arithmetic and control unit 15 such as a microprocessor, a signal for controlling to drive the pneumatic cylinder 12, as shown in FIG. 3. The load cells 4 and 5 serving as the load detector are connected to the arithmetic and control unit 15. Where the load detector is of such a type as the load cell for delivering an analog signal, the load cells 4 and 5 as the load detector are connected to the arithmetic and control unit 15 such as the microprocessor through an A/D converter 17. An output range or span of each of the load cells are adjusted appropriately by a so called "span adjustment". A memory or storage device 18 is connected to the arithmetic and control unit 15. The memory device or unit 18 stores therein programs, including calculation formulas necessary for converting the magnitudes of the loads, represented by output signal of the load detector (load cells 4 and 5), into flow rate values, and constant values necessary for the calculation formulae, a correction formula and a correction value etc. Detected data of the load detector 4 and 5 and results of calculation in the arithmetic and control unit 15 are also stored in a time series manner in the memory device 18. The memory device 18 includes a RAM and a ROM. Reference numeral 19 denotes a display unit capable of displaying the calculation results in terms of a calculation degree.

Basically, the flow meter 30 according to the first preferred embodiment of the invention has the above construction.

Figure 4:
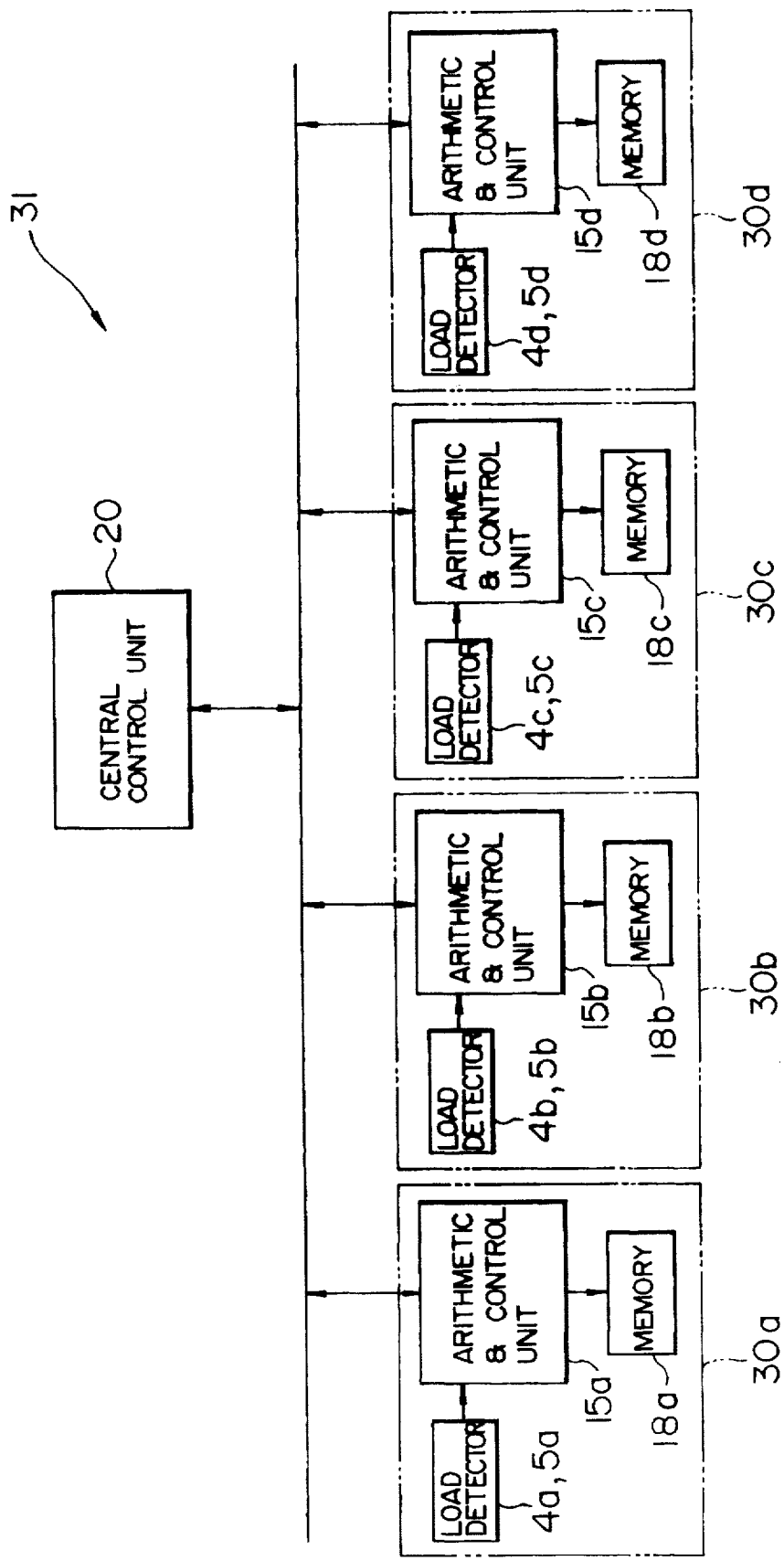
FIG. 4 is a block diagram of a flow rate measurement system having a plurality of flow meters of FIG. 1.

In an actual job site (processing plant) where the flow rate of a particulate material, such as rice grains and wheat grains, is continuously measured, a plurality of flow meters are often provided or installed in one system. One example of such a system, forming a modification of the first embodiment, is shown in FIG. 4. In the system 31 of FIG.

4, for example, four arithmetic and control units 15a to 15d are connected to a centralized or central control unit 20 such as a microcomputer or a minicomputer. The data of flow meters 30a to 30d been given to the central control unit 20, the degree of opening of an opening-closing valve member (not shown in FIG. 4, but has a function substantially the same as that of a flow rate control gate mechanism described later in an embodiment of FIGS. 10 to 14), provided at an upstream portion of each of the flow meters 30a to 30d, is adjusted by the central control unit 20, thereby controlling all the flow rates in the system 20.

Data of various kinds of raw particulate materials (that is, particulate materials G to be treated or processed) upon arrival at the processing plant are stored in the central control unit 20, and also information of what kind of raw particulate material G is flowing through a respective one of the flow meters is held by the central control unit 20, and this information is used when processing each raw particulate material G.

When the central control unit 20 supplies or delivers to any of the arithmetic and control units 15a to 15d of the flow meters 30a to 30d a signal indicating that the raw particulate material G is changed to a new one, the arithmetic and control unit 15 of the designated flow meter 30 confirms that the new particulate material G has flown thereinto, and then effects a correction of the flow rate or calibration of the flow meter in accordance with the invention. Alternatively, the central control unit 20 may deliver a flow rate correction or calibration operation initiation instruction signal to the relevant arithmetic and control unit 15 so that this arithmetic and control unit 15 can effect a correction of the flow rate or a calibration in accordance with the invention. In the latter case, regardless of whether or not the kind of particulate material G, flowing through the flow passage 1, is changed, the correction of the flow rate in the flow meter or calibration thereof is effected at predetermined timings (for example, at predetermined time intervals).

Next, a load conversion operation, and principles of calculation of a dynamic load-type flow rate and an actual flow rate, which are necessary for the correction of the flow rate in the flow meter 30 shown in FIGS. 1 to 3 or the calibration thereof, will be described.

When the opening-closing valve member 9 of the movable valve device 10 is in its open position A as shown in FIG. 1, a downward-flow impact load of the falling (or downwardly-flowing) particulate material G acts on the opening-closing valve member 9. This downward-flow impact load is detected by the load cells 4 and 5 in the form of a sum of loads applied to the load cells 4 and 5, and this downward-flow impact load, that is, the dynamic load, is converted into a flow rate, by a predetermined calculation formula.

The mode or condition or state shown in FIG. 1 is a normal operating mode or condition or state (that is, a normal mode or condition or state of use) in which the flow rate of the particulate material G is measured while the particulate material G is flowing or passing through the flow meter 30, and this condition is a particulate material-flowing/flow rate-measuring mode. Analog signals, delivered from the load cells 4 and 5 in accordance with the downward-flow impact load corresponding to the flow rate of the particulate material G, are converted by the A/D converter 17 (FIG. 3), and are supplied as an impact load signal EA serving as the dynamic load signal to the arithmetic and control unit 15 (FIG. 3) and is converted therein into a flow rate value QA according to the impact load (dynamic load), by means of the following calculation formula 1:

$$QA = EA * a \qquad \text{calculation formula 1}$$

where a represents a conversion factor for converting the impact load (dynamic load) into the flow rate.

Figure 6:
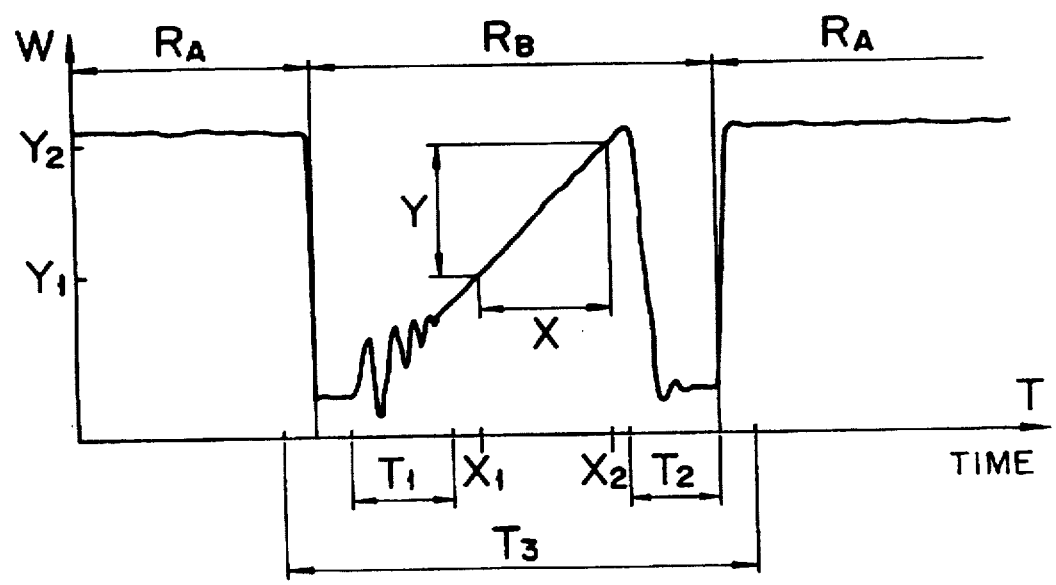
FIG. 6 is a time chart showing a variation, of a dynamic load and a static weight load, with time in the flow meter of FIG. 1.

In FIG. 6 in which the abscissa axis represents time t, and the ordinate axis represents the dynamic load W acting on the load cells 4 and 5, regions indicated by "RA" are regions where the dynamic load consists essentially of the impact load, and a region indicated by "RB" is a region where the dynamic load consists essentially of the static load or weight. When the flow rate of the particulate material G is kept substantially constant, the dynamic load signal W from the load cells 4 and 5 hardly varies with time. Therefore, for example, if the output of the flow meter 30 is adjusted such that a predetermined bias is beforehand applied to the output W of the load cells 4 and 5 so that the output W (=EA) of the load cells 4 and 5 can become zero in a condition where the opening-closing valve member 9 is in the open position A, and where the particulate material G is not flowing (that is, in a condition in which only the constantly acting static loads or weights of the tubular member 3, the opening-closing valve member 9, the pneumatic cylinder 12, etc., act on the load cells 4 and 5), the output W coincides with the impact load EA, and the flow rate value QA can be obtained merely by multiplying the impact load signal EA (corresponding to the output W representing the impact load (dynamic load)) by the conversion factor a.

Figure 2:
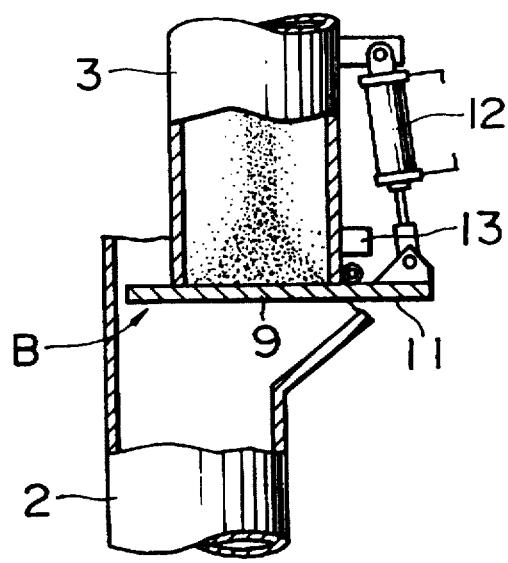
FIG. 2 is a partly-broken, front-elevational view of a portion of the flow meter, shown in FIG. 1, in a state for measuring an actual flow rate.

When the opening-closing valve member 9 of the movable valve device 10 is set to the closing position B as shown in FIG. 2, the falling (or downwardly-flowing) particulate material G is deposited or accumulated on the opening-closing valve member 9 within the tubular member 3. The total weight of the thus deposited particulate material G is sampled and detected at desired time intervals, and a change of the weight per unit time is found or calculated to obtain the actual flow rate. Namely, the condition or state shown in FIG. 2 is a condition or state in which the flow of the particulate material G is temporarily blocked or intercepted within the flow meter 30 so as to effect the correction of the flow rate or calibration, while keeping the flow rate of the particulate material G constant at the upstream side of the flow meter 30. Thus, this mode or condition or state is a flow rate correction or flow meter calibration mode. As in the normal mode, the analog signals from the load cells 4 and 5 are converted by the A/D converter 17 (FIG. 3) into a static load or weight signal EB, representing the total weight of the deposited particulate material G, which signal is sent to the arithmetic and control unit 15 (FIG. 3) where the signal EB is converted into a weight Y by means of the following calculation formula 2:

$$Y = EB * b \qquad \text{calculation formula 2}$$

where b represents a conversion factor for converting the output in the static load or weight measurement range of the load cells 4 and 5 into the actual weight.

The actual flow rate QB is obtained from weight values Y1 and Y2, measured respectively at consecutive sampling times X1 and X2, by means of the following calculation formula 3:

$$QB = (Y2 - Y1)/(X2 - X1) \qquad \text{calculation formula 3}$$

During the time period indicated by the region RB in FIG. 6, the weight W (expressed by Y in terms of a scale)

increases as the amount of deposition or accumulation of the falling particulate material G increases. Therefore, based on the information of the weight Y1 at time X1 and the information of the weight Y2 at time X2, the actual flow rate QB is obtained by the calculation formula 3.

Before describing details of the correction of the flow rate in the flow meter 30 or the calibration thereof, basic principles of the correcting or calibrating operation will first be described briefly.

Figure 5:
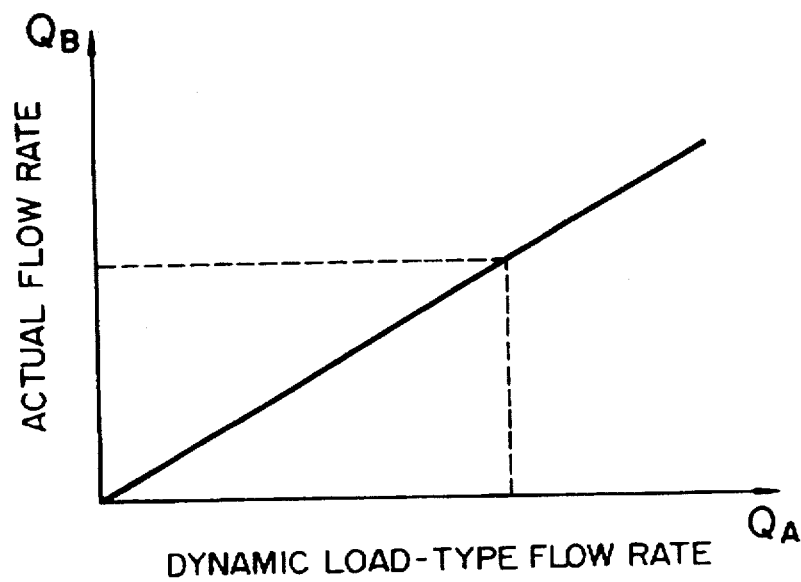
FIG. 5 is a graph generally showing the relation between a dynamic load-type flow rate value and an actual flow rate value in the flow meter of FIG. 1.

Since the flow of the same particulate material G through the same flow passage 1 is measured, the impact load flow rate value (dynamic load-type flow rate value) QA should essentially or inherently coincide with the actual flow rate value QB obtained from the static load or weight. The actual flow rate value QB is obtained by the measurement according to the definition of the weight flow rate or mass flow rate, and therefore it is thought that in so far as the calibration of each associated apparatus itself is effected properly, the actual flow rate value QB is an accurate value independent of the material to be measured. On the other hand, the dynamic load-type flow rate value QA can vary depending on various factors, of the material to be measured, such as bulk specific gravity and resiliency; however, so far as the same material to be measured is concerned, the dynamic load-type flow rate value QA increases as the actual flow rate increases. Namely, the dynamic load-type flow rate value QA has a positive correlation with to the actual flow rate QB, and also is virtually proportional to the actual flow rate QB as shown in FIG. 5. Therefore, the relation, indicated by the following equation or calculation formula 4, can be established:

$$QA=k*QB \qquad \text{calculation formula 4}$$

where k represents a correction factor.

A dynamic load-type or impact load-type flow rate value QAc after the correction or calibration can be obtained from the following calculation formula 5 derived from the calculation formulae 1 and 4:

$$QAc=QA*k$$

$$QAc=EA*a*k \qquad \text{calculation formula 5}$$

where k represents the flow rate correction factor, a represents the conversion factor, and EA represents the impact load signal, as described above.

Therefore, if it is desired to provide a correction processing loop to be continuously executed according to a computer program, a is replaced by "a*ku".

Now, the flow rate correction or flow meter calibration operation in the flow meter 30 will be described in detail with reference to FIGS. 6 and 7.

Normally, the flow meter 30 is operating in the mode to continuously detect the impact load as the dynamic load. Therefore, the impact load signal EA is constantly inputted as shown in Step S1, and the dynamic load-type flow rate QA is constantly calculated or found by the calculation formula 1 as shown in Step S2.

In Step S3, it is always checked by the arithmetic and control unit 15 of the flow meter 30 whether or not the raw particulate material G is changed and also whether or not there is an instruction that the correction calculation should be effected, and as long as these events or situations do not occur, the program or processing returns to Step 1, i.e. Step S1 and Step S2 are repeated. Where the plurality of flow meters 30a, 30b,... are connected to the central control unit 20 as described above with reference to FIG. 4, information indicating the occurrence of the above-mentioned events or situations can be given from the central control unit 20 to corresponding one or ones of the flow meters 30a −30d. If the signal representative of the change of the raw particulate material G, or the flow rate correction calculation initiation instruction signal is produced, the program proceeds to a flow rate correction or calibration processing routine of infra Step S4.

When the program processing proceeds to the correction processing routine, the detection of the dynamic load or impact load is not effected, and therefore during a period of time (corresponding to a time period T3 in FIG. 6) before the program exits from the correction processing routine, that is, when the correction processing is being effected, there is used the impact load signal EA obtained immediately before the program enters the correction processing routine, whereby even when the plurality of flow meters are monitored and controlled by the central control unit 20, the central control unit 20 can continue to control all of the flow rates in the system.

In a case where the flow meter 30 is so constructed that the ratio of the impact load to the batch load is substantially 1:100 as described above, and for example, if the impact load is about 150 g, i.e. 150 gram-force, with the flow rate of 5 tons/hour, then the batch load amounts to about 14 kg for ten seconds. When trying to process the signal of such a wide range by one amplifier, there is a possibility that the precision of measurement of the impact load is lowered. Therefore, in Step S5, the measurement range is switched from a gram unit for the impact load to a kilogram unit for the batch load. Namely, the measurement range is switched from the measurement range for the region RA (FIG. 6) to the measurement range for the region RB.

In Step S6, the opening-closing valve member 9 of the movable valve member 10 is switched from the open position A to the closing position B, and simultaneously with this switching operation, time T is reset to 0, and time (time period) T after setting the opening-closing valve member 9 to the closing position B is measured.

When the opening-closing valve member 9 is set to the closing position B, the total load of the falling particulate material G acts on the opening-closing valve member 9, and the output of the load detector 4 and 5 are not stable at first due to vibrations etc. In an example in Step S7, it is estimated that stability time period or stabilizing time period T1 required for extinction or elimination of the disturbance such as the vibrations is 3 seconds.

In Step S8, based on a first point of time X1 for weight measurement, after the elapse of time T1 and the output EB1 of the load cells 4 and 5 at the time point X1, the time point X1 and a weight value Y1 at this time point X1 are obtained.

With the elapse of time T, the amount of deposited or accumulated the particulate material G (having flown through the flow passage 1) on the opening-closing valve member 9 within the tubular member 3 increases, so that the load acting on the load cells 4 and 5 increases. If the flow rate is constant, the flow rate can be found by measuring the weight of the deposited or accumulated particulate material G. In Step S9, it is judged whether or not the elapse of time T is 8 seconds.

In Step S10, a time point X2 after time T elapses 8 seconds (X2=8 if X1 is set to 0 in Step S8), as well as a weight value Y2 derived from the output EB2 of the load cells 4 and 5 at this time point X2, is obtained.

In Step S11, the actual flow rate QB is derived or calculated from the calculation formula 3. If desired, a zero or reference point for the output EB1, EB2 of the load cells 4 and 5, from which the actual flow rate QB is derived, may not be adjusted because only the difference of therebetween is effective as apparent from the calculation formula 3.

In Step S12, the flow rate correction factor k is derived or calculated from one form of the calculation formula 5, and the dynamic load-type flow rate QAc after the correction or calibration is derived or calculated from another form of the calculation formula 5 by using this flow rate correction factor k.

If the same flow rate correction is utilized until the next flow rate correction operation is effected, the conversion factor a is replaced by a*k in the program processing operation as shown in Step S13.

When the flow rate correction calculation is completed, the opening-closing valve member 9 of the movable valve device 10 is returned to the open position A as shown in Step S14. As a result, the particulate material G, having been deposited or accumulated on the opening-closing valve member 9 within the tubular member 3, drops, so that the flow meter 30 is returned to the condition in which the opening-closing valve member 9 receives the normal impact load. In this case, also, the output of the load cells 4 and 5 becomes unstable at first because of an abrupt load change, and therefore although not shown in the flow chart of FIG. 7, preferably stability time or stabilizing time T2 as shown in FIG. 6 is preserved.

After the output of the load cells 4 and 5 becomes stable, the load detection range is returned from the measurement region RB, corresponding to the kg-unit range, to the measurement region RA corresponding to the gram-unit range, and the operation control is returned to the normal mode or routine (that is, to Step S1) in which the impact load (dynamic load) is detected.

In the above arithmetic and control unit 15 such as a microprocessor, the processing Step S2 of the program therein corresponds to a function of dynamic load flow rate calculation means of the flow meter 30, and the processing Steps S5 to S11 of the program correspond as a whole to a function of actual flow rate calculation means of the flow meter 30, and the processing Step S12 of the program corresponds to a function of means for calculating the correction factor of the flow meter 30. These are quantitative calculations of physical quantities, and therefore in so far as mathematically- or algebraically-equivalent quantities can be derived, their specific calculation procedures may be changed as desired.

In the flow meter 30 of the above construction and the system 31 including the plurality of flow meters 30, when correction of the dynamic load-type flow rate value QA in the impact load detection-type flow meter, i.e. flow meter 30 in the normal mode, to make it equal to the actual flow rate OB determined from the measured weight can be effected automatically without requiring any manual labor or operation. And besides, when it becomes necessary to correct the flow rate indication or calibrate the flow meter as a result of change of the raw particulate material G, this correction or calibration can be effected substantially promptly. Therefore, the more precise flow rate measurement can be made constantly as compared with the conventional impact load detection-type flow meters. Moreover, in the flow meter 30, the movable valve device 10, having the opening-closing valve member 9, the load detector constituted by the load cell 4 and 5, and the arithmetic and control unit 15 are combined together as if an impact load detection-type flow meter and an actual flow rate meter are formed on the common tubular member 3, and the construction of the flow meter is relatively simple.

In addition, as the measurement ranges for the load cells 4 and 5 as a load detector, there are provided two ranges, that is, the larger range for the detection of the static load or weight and the smaller range for the detection of the impact load, and therefore the detection of the load can be always effected over substantially the full range or span of the load cells 4 and 5, so that the accurate load output can be obtained.

Furthermore, the plurality of arithmetic and control units 15a, 15b, ..., of the plurality of flow meters 30a, 30b, ... installed in a processing plant, are connected to the central control unit 20, and the flow rate of each of the flow meters is automatically corrected in response to the signal from the central control unit 20. Therefore, in accordance with the change of the raw particulate material G or with a predetermined condition (for example, at predetermined time intervals), the correction operation initiation instruction signal etc. can be delivered to a respective one of the flow meters 30a, 30b, ..., and therefore there is no need to control the flow meters 30a, 30b, ... individually of one another by a manual labor or operation, and the continuous detection of the flow rate by the detection of the dynamic load can be constantly made accurately.

Next, a flow meter according to a second preferred embodiment of the invention will be described with reference to FIGS. 8 and 9.

In FIGS. 8 and 9, the flow meter 60 comprises a particulate material supply portion 41, a particulate material flow rate detection portion 42, a particulate material flow rate calculation and correction control portion 43, and a particulate material discharge portion 44. A flow passage 45 for a particulate material G is formed in the flow meter 60 to extend from the supply portion 41 through the particulate material detection portion 42 down to the particulate material discharge portion 44.

A first inclined flow passage portion 46 for guiding the particulate material G supplied from a hopper etc. (not shown) is provided in the particulate material supply portion 41, and also a second inclined flow passage portion 48 is formed in the supply portion 41. The second inclined flow passage portion 48 extending in a direction substantially perpendicular to the first inclined flow passage portion 46 is connected to the first inclined flow passage portion 46 by a gently-curved flow passage portion 47. An inclined guide plate or flow-down plate 49 is mounted in a stationary manner on a flow meter frame 59 to form the second inclined flow passage portion 48.

The flow rate detection portion 42 comprises a load-receiving plate-like member 50, which is provided in an inclined manner in the flow passage 45 for the particulate material G so as to receive a dynamic load corresponding to the flow rate of the particulate material G passing through the flow passage 45, a load cell 51 serving as a load detector for detecting a magnitude of the load received by or applied to the load-receiving plate-like member 50, and a weir member 52 movable between a block position H where the weir member 52 intercepts or blocks the flow of the particulate material G at a downstream region of the load-receiving plate-like member 50 and an open position J where the weir member 52 allows the particulate material G to flow or pass.

The load-receiving plate-like member 50 is supported by the load cell 51 in such a manner that the plate-like member 50 is spaced by a predetermined distance or height L vertically downwardly from the inclined guide plate 49 of the supply portion 41 in generally or substantially parallel relation thereto. Therefore, the particulate material G, flowing over the inclined guide plate 49 along the second inclined flow passage portion 48 of the flow passage 45, falls a distance not smaller than L from a downstream end 49a of the guide plate 49 to the plate-like member 50, so that the plate-like member 50 is subjected to a drop impact corresponding to the flow rate of the particulate material G.

When the weir member 52 is disposed in the open position J indicated by phantom lines in FIG. 8, the particulate material G, having dropped on the load-receiving plate-like member 50, flows down over the plate-like member 50 along a flow passage 53 defined by the plate-like member 50, and is discharged to the exterior through the discharge portion 44, at a bottom portion of the frame 59 of the flow meter 60, constituted by a discharge tube and a bellows 58 for preventing the particulate material G from dissipation. At this time, similarly to the load cells 4 and 5 of the flow meter 30 of the first embodiment as described above, the load cell 51 serving as the load detector receives not only an impact load EAf1 proportional to the flow rate of the particulate material G dropping on the plate-like member 50, but also a substantially static load EAf2 corresponding to the amount of the particulate material G present on the plate-like member 50 upon flowing down thereover. Therefore, when the particulate material G is flowing continuously, the load cell 51 receives a total load EAf of a magnitude equal to (EAf1+EAf2). The magnitude of the dynamic impact load EAf1 depends on various factors such as the weight flow rate (mass flow rate) of the particulate material G, the height L and the angle M of inclination of the load-receiving plate-like member 50. On the other hand, the magnitude of the static load EAf2 depends not only on an inclined angle T of the load-receiving plate-like member 50 but also on the weight of the particulate material G present on the plate-like member 50 upon flowing thereover. This weight of the particulate material G, in turn, depends on a length of the plate-like member 50, and a thickness of a layer of the particulate material G on the plate-like member 50 (in other words, a stacked height of the particulate material G at the flow passage portion 48) etc. The ratio between magnitudes of these two kinds of loads EAf1 and EAf2 is determined appropriately, and may be determined in view of the technique disclosed in Japanese Patent Unexamined Publication No. 63-195524 described above as the prior art and incorporated herein by reference thereto, if necessary. If a suitable zero point adjustment is made for the dynamic load EAf, this dynamic load EAf can be treated in the similar manner to the dynamic load EA (impact load) in the flow meter 30 according to the first embodiment. The inclination angle T of the plate-like member 50 is about 45 degrees in the example illustrated in FIG. 8, while this angle T may be selected freely as desired so long as the particulate material G can flow down thereover or therealong, i.e. this angle T may be greater or smaller than 45 degrees, and may be greater or smaller than the angle of inclination of the flow-down plate 49.

On the other hand, when the weir member 52 is disposed in the closing position H indicated by solid lines in FIG. 8, the particulate material G, having fallen on the load-receiving plate-like member 50, is blocked or intercepted by the weir member 52, and is therefore deposited or accumulated on the plate-like member 52. A change of a load EBf, acting on the load cell 51 in accordance with this deposition or accumulation, is substantially similar to a change of the load EB acting on the load cells 4 and 5 in the closing position of the opening-closing valve member 9 of the flow meter 30 according to the first embodiment.

Reference numeral 54 denotes guide members, such as rollers, for guiding the vertical (upward and downward) movement or displacement of the weir member 52 between the open position J and the closing position H. Similarly to the opening-closing valve member 9 of the flow meter 30 according to the first embodiment, the weir member 52 is connected to drive means 55 (which comprises a solenoid valve and a pneumatic cylinder) driven under the control of the arithmetic and control unit 43, and the weir member 52 is moved upward or downward when a piston rod of the pneumatic cylinder of the drive means 55 is contracted or extended. In the flow meter 60 according to this embodiment, so long as the opening and closing of the flow passage is concerned, the weir member 52 replaces the opening-closing valve member 9 of the flow meter 30 according to the first embodiment. The pneumatic cylinder drive means 55 may be replaced by any other appropriate drive means such as an electric motor which drives and rotates at least one of the guide rollers 54.

Figure 7:
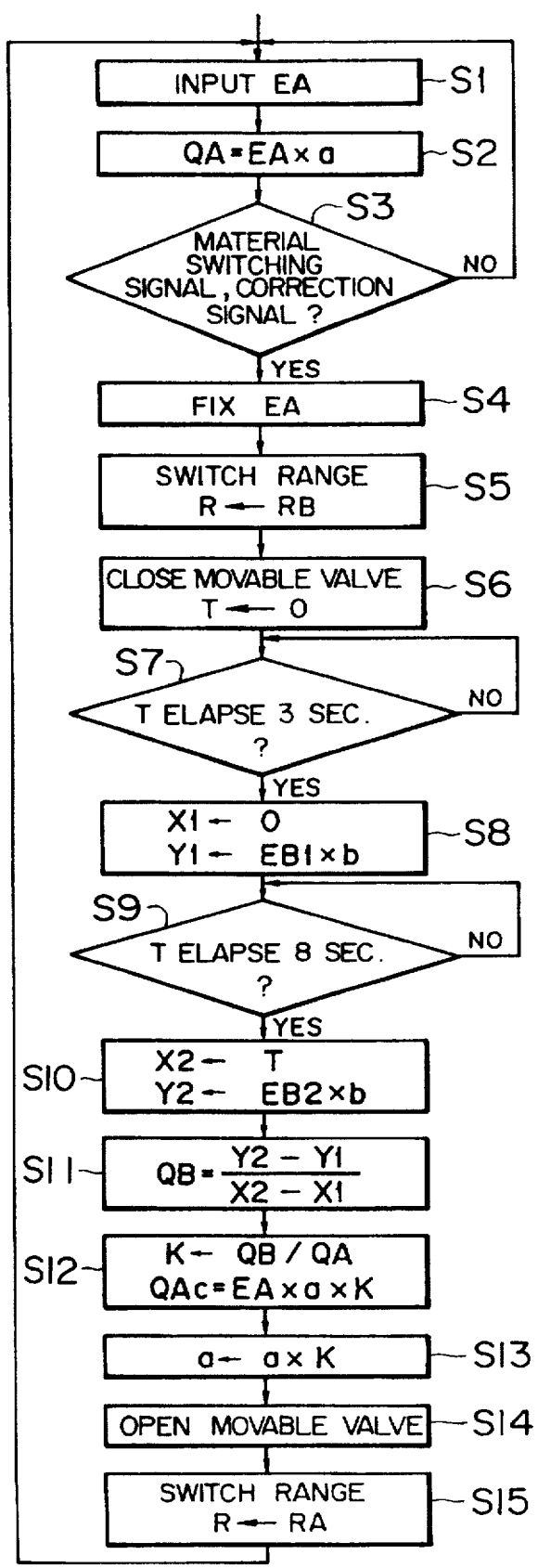
FIG. 7 is a flow chart or sheet showing a processing procedure of measuring the flow rate by the measurement of the dynamic load in the flow meter of FIG. 1, as well as a processing procedure of correcting the flow rate.

The arithmetic and control portion 43, constituted by a microprocessor etc., serving as the arithmetic and control unit is designed substantially similarly to the arithmetic and control unit 15 of the flow meter 30 according to the first embodiment, and utilizing the relations and characteristics shown in FIGS. 5 and 6, a dynamic load-type flow rate QA, an actual flow rate QB and a flow rate correction factor k are calculated or obtained from the dynamic load EAf (corresponding to EA) and the static load or weight EBf (corresponding to EB) in accordance with a procedure similar to that shown in FIG. 7. Therefore, this flow meter 60 can be also configured as in FIG. 3, and can support a system including a plurality of flow meters as in FIG. 4. In FIGS. 8 and 9, reference numeral 56 denotes a display portion corresponding to the display unit 19 of the flow meter 30.

The flow meter 60 may be provided with a supply control portion for adjusting or controlling the flow rate of the particulate material G to be supplied or fed to the flow rate detection portion 42.

Next, with reference to FIGS. 10 to 13, description will be made of a flow meter 90 in which a particulate material flow rate-adjusting gate is further provided in the particulate material supply portion of the flow meter shown in FIGS. 8 and 9.

The flow meter 90, schematically shown in FIGS. 10 and 11, includes a flow rate-adjusting gate mechanism 63 in a particulate material supply portion 61 corresponding to the particulate material supply portion 41 of the flow meter 60, and this gate mechanism 63 controls the flow or supply of a particulate material G into a flow passage portion 62 corresponding to the flow passage portion 48. The flow meter 90 is substantially identical in construction or structure to the flow meter 60 except that the particulate material supply portion 61 with the flow rate-adjusting gate mechanism 63 replaces the particulate material supply portion 41 and that an arithmetic and control unit 43 has a control processing function of controlling the supply of the particulate material G by the flow rate-adjusting gate mechanism 63. Therefore, only these differences will be described below in detail.

As schematically shown in FIGS. 10 and 11, the flow rate-adjusting gate mechanism 63 comprises an electric motor 64, and a pivotally movable gate member 67 which is pivotally moved or displaced in directions M and N by the electric motor 64 to change a degree S of opening (or flow area) of a flow passage portion 66 so as to adjust the flow rate of the particulate material G from a particulate material reservoir 65 to the flow passage portion 62.

Figure 12:
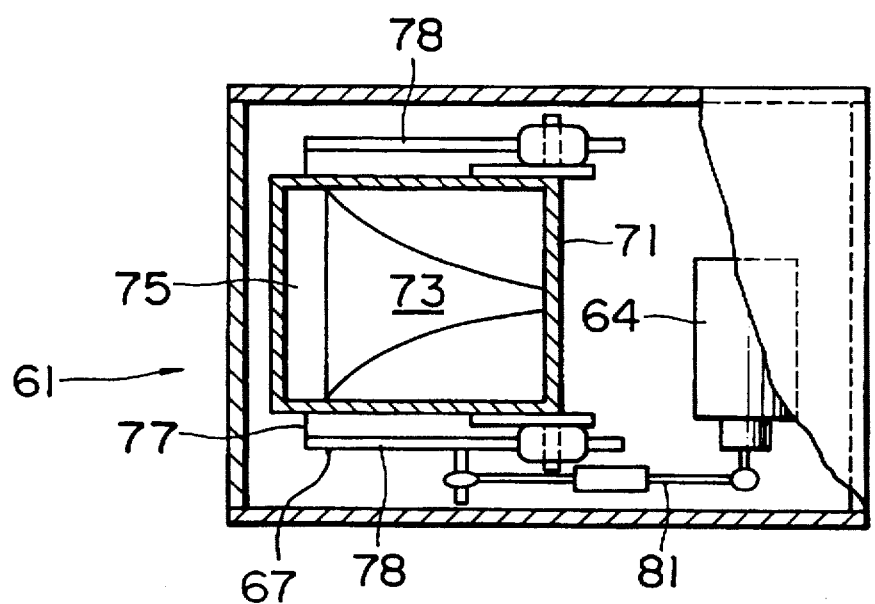
FIG. 12 is a partly-broken, plan view showing a detailed structure of particulate material supply portion of the flow meter of FIG. 10.
Figure 13:
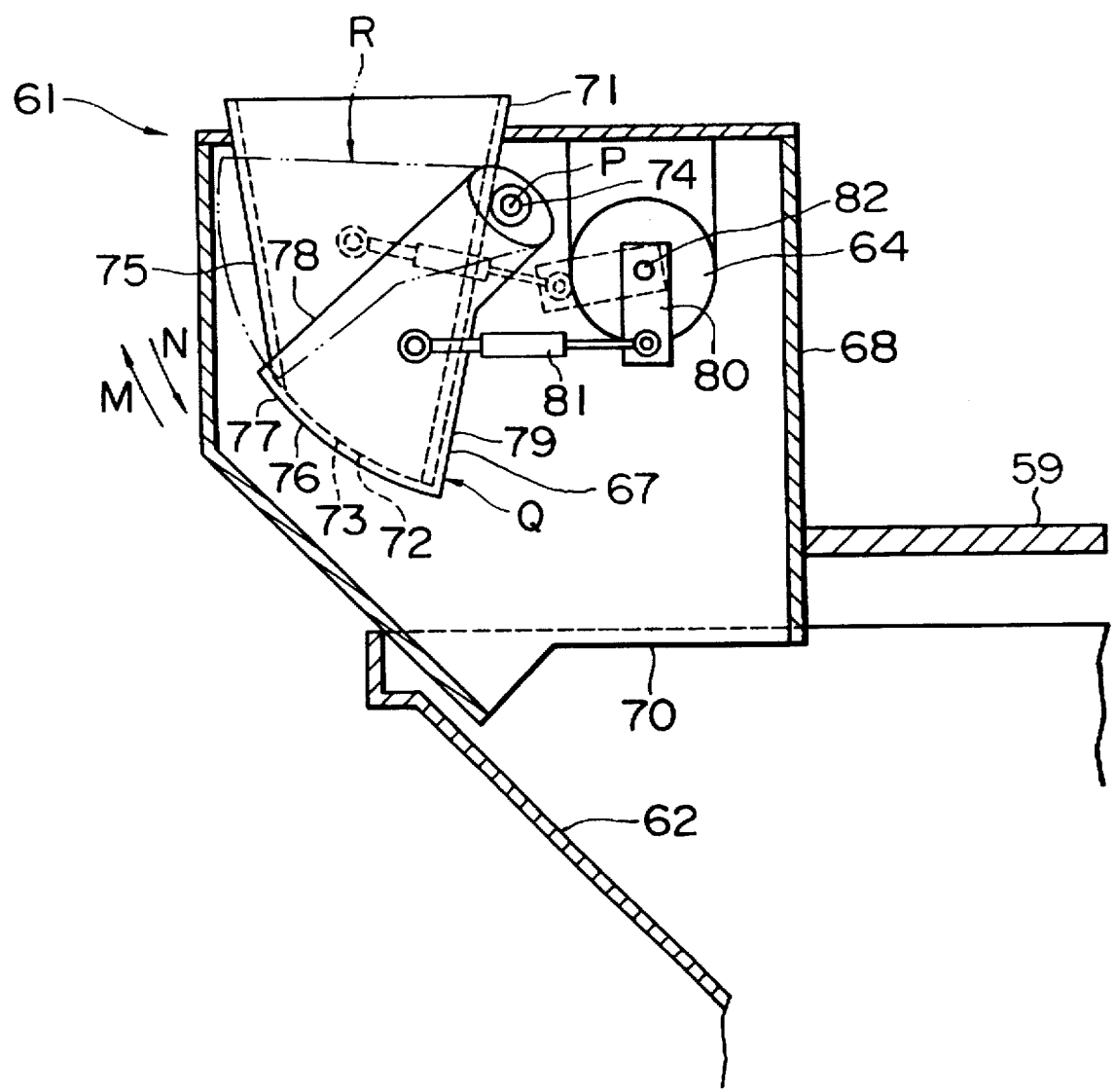
FIG. 13 is a vertical cross-sectional view showing a detailed structure of the particulate material supply portion of the flow meter of FIG. 10.

More specifically, the flow rate-adjusting gate mechanism 63 has, for example, a construction or structure shown in FIGS. 12 and 13.

In FIGS. 12 and 13, a frame 68 of the flow rate-adjusting gate mechanism 63 is fixedly mounted on the frame 59 of the flow meter 90, and has a lower end 70 open to the flow passage portion 62. A particulate material-supplying, tubular portion 71 having a square cross-section, decreasing in cross-sectional area progressively toward a lower end thereof, is fixedly secured to the frame 68. An outlet opening 73 is formed at the lower end of the particulate material-supplying, square tubular portion 71, and has an arcuate lower edge 72 forming a part of a circle around a center P (FIG. 13). The gate member 67, having a generally sector-shape as viewed from the side thereof and U-shaped bridge-like configuration, is mounted to be outside of the lower edge or end portion 72 and an outer side edge portion 75 of the square tubular portion 71 so that the gate member 67 can be pivotally moved in the directions M and N about a shaft 74 with an axis passing through the center point (or center line) P. The gate member 67 has a gate plate portion 77 at a generally partially cylindrical portion 76 having an arcuate shape as seen in FIG. 13. Radially extending portions 78 and 79, at upper and lower edges, of the gate member 67 are opened. Link members 80 and 81 are adapted to displace the gate member 67 pivotally in the directions M and N around the shaft 74 in response to forward and backward rotation of an output shat of the motor 64. When the gate member 67 is fully displaced in the direction N to be disposed to a position Q shown by solid lines in FIG. 13, the opening 73 is completely closed by the gate plate portion 77 of the gate member 67, so that the particulate material G will not flow out of the supply portion 61. On the other hand, when the gate member 67 is fully displaced in the direction M to be disposed in a position R shown by phantom lines in FIG. 13, the opening 73 is completely opened, so that the flow rate of the particulate material G through the opening 73 becomes maximal. A magnitude S of the opening or aperture 73 which is not closed or blocked by the gate member 67 can be changed, according to the position, of the gate member 67, between the positions Q and P to be defined in response to forward (normal)/backward (reverse) rotation of the motor 64, to thereby change or adjust the flow rate of the particulate material G from the not-closed or blocked part of the opening 73.

The flow rate adjustment gate mechanism 63 may be of any shape other than that shown in FIGS. 10 to 13, so long as the flow rate of the particulate material G from the supply portion can be adjusted or controlled.

It will be apparent that the flow meter 90 with the supply gate can be operated in the similar manner to the flow meter 60 shown in FIGS. 8 and 9 in a case where the degree S of opening at the opening or aperture 73 to be defined by the gate member 67 of the gate mechanism is set to a fixed level or magnitude.

Figure 14:
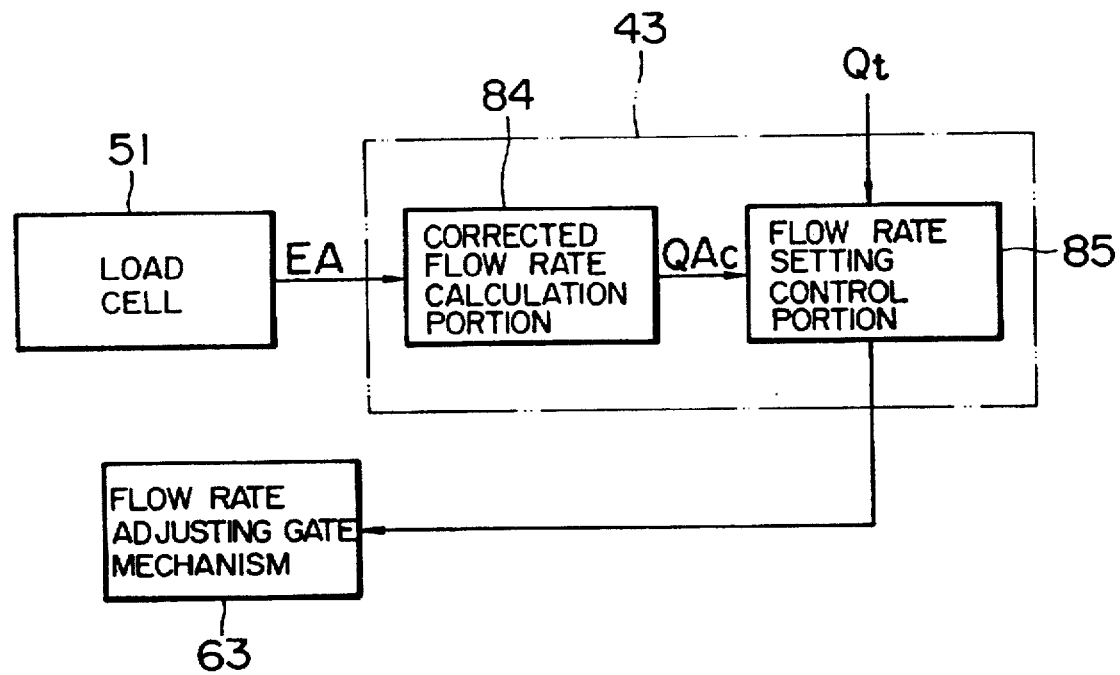
FIG. 14 is a block diagram of a control system for controlling the flow rate in the flow meter of FIG. 10.
Figure 15:
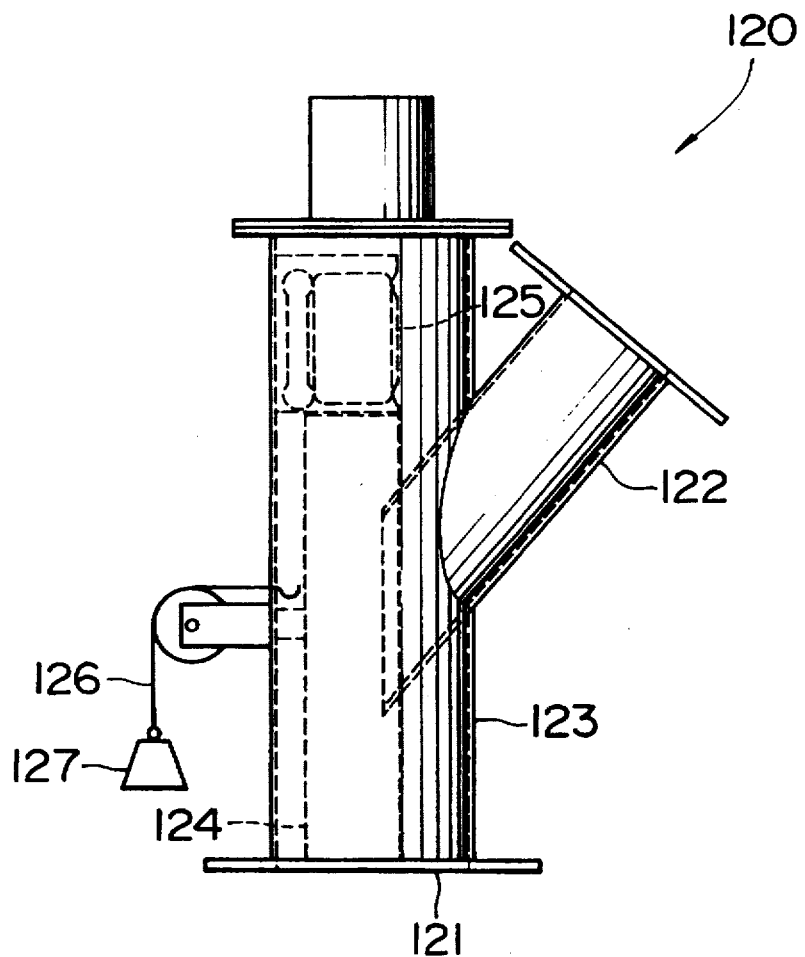
FIG. 15 an explanatory view of an example of the conventional flow meters.

In this flow meter 90, the following control may be employed. As shown in FIG. 14, a flow rate QA in accordance with a dynamic load, i.e., dynamic load-type flow rate QA, detected by a load cell 51 serving as the load detector, is corrected in accordance with the procedure shown in FIG. 7, and then the opening degree S at the opening 73 of the flow rate-adjusting gate mechanism 63 in the open condition of this flow rate-adjusting gate mechanism 63 is controlled, so that the corrected dynamic load-type flow rate QAc can coincide with a predetermined target flow rate value Qt, by a flow rate-setting control portion 85 additionally provided in the arithmetic and control unit 43 in association with a corrected flow rate calculation portion 84.

The flow rate-adjusting gate mechanism 63 may be also provided in the flow meter 30 of the first embodiment shown in FIGS. 1 and 2 as having described above with reference to FIG. 4, so that the flow rate (opening degree S) can be controlled as described with reference to FIG. 14.

What is claimed is:

1. A flow meter comprising:
   a tubular member forming a flow passage for a particulate material;
   an opening-closing valve member connected to the tubular member so as to open and close a the downstream end of the tubular member, the opening-closing valve member being adapted to receive a dynamic load corresponding to a flow rate of the particulate material flowing through the flow passage, when the opening-closing valve member is in its open position to open the downstream end of the tubular member; and
   a load detector for detecting the load acting on the opening-closing valve member;
   wherein the flow meter further comprising:
   an arithmetic and control unit including:
      dynamic load flow rate calculation means for calculating a dynamic load flow rate of the particulate material from a measured value of the load detector when the opening-closing valve member allows the flow of the particulate material, so that the particulate material is flowing through the flow passage;
      actual flow rate calculation means for calculating an actual flow rate of the particulate material based on a measured value of the load detector, representing the static load of the particulate material accumulated within the tubular member for a predetermined time period after the flow of the particulate material is interrupted by the opening-closing valve member, and a value of the predetermined time period; and
      means for obtaining a correction factor for converting the dynamic load flow rate value into the actual flow rate value.

2. A flow meter according to claim 1, in which the load detector has a range for detecting the dynamic load of the particulate material, and a range for detecting the static load of the particulate material.

3. A flow meter system comprising:
   a plurality of flow meters as defined in claim 1,
   wherein the arithmetic and control unit of each of the plurality of flow meters has a normal operating mode for obtaining the dynamic load flow rate, and a correction mode for obtaining the correction factor, and the arithmetic and control units are connected to a centralized control unit which controls the arithmetic and control units in a centralized manner, and when the particulate material flowing through the flow passage in at least one of the flow meters is changed to a different one, the centralized control unit supplies to the at least one flow meter a control signal so as to change the associated arithmetic and control unit from the normal operating mode to the correction mode.

4. A flow meter comprising:
   a load-receiving plate member disposed in an inclined or oblique manner in a flow passage for a particulate material, the load-receiving plate member being adapted to receive a dynamic load corresponding to a flow rate of the particulate material flowing through the flow passage;
   a load detector for detecting a magnitude of the load acting on the load-receiving plate member; and
   a weir member movable between a block position where the weir member blocks the flow of the particulate material at a position downstream of the load-receiving plate member and an open position where the weir member allows the flow of the particulate material; wherein the flow meter further comprising:

an arithmetic and control unit including:
dynamic load flow rate calculation means for calculating a dynamic load flow rate of the particulate material from a measured value of the load detector when the weir member allows the flow of the particulate material so that the particulate material is flowing through the flow passage;
actual flow rate calculation means for calculating an actual flow rate of the particulate material based on a measured value of the load detector, representing the static load of the particulate material accumulated on the load receiving plate member for a predetermined time period after the weir member is set to the block position, and a value of the predetermined time period; and
means for calculating a correction factor for converting the dynamic load flow rate to the actual flow rate.

5. A flow meter according to claim 4, in which the load detector has a range for detecting the dynamic load of the particulate material, and a range for detecting the static load of the particulate material.

6. A flow meter system comprising:

a plurality of flow meters as defined in claim 4, wherein the arithmetic and control unit of each of the plurality of flow meters has a normal operating mode for obtaining the dynamic load flow rate, and a correction mode for obtaining the correction factor, and the arithmetic and control units are connected to a centralized control unit which controls the arithmetic and control units in a centralized manner, and when the particulate material flowing through the flow passage in at least one of the flow meters is changed to a difference one, the centralized control unit supplies to the at least one flow meter a control signal so as to change the associated arithmetic and control unit from the normal operating mode to the correction mode.

7. A method of calibrating a flow meter comprising the steps of:

measuring, by a load detector, a magnitude of a dynamic load, depending on a downward-flow impact of a particulate material flowing through a flow passage, and a magnitude of the static load corresponding to a total amount of the particulate material having been accumulated at a block position in a predetermined time period after the flow of the particulate material is blocked;

calculating a value of a dynamic load flow rate of the particulate material, corresponding to a measured value of the dynamic load, from the measured value of the dynamic load by a first calculation formula, and also calculating a value of an actual flow rate of the particulate material from a measured value of the static load in the predetermined time period by a second calculation formula;

obtaining a correction factor for bringing the dynamic load flow rate value, depending on difference of the particulate materials, into agreement with the actual flow rate value; and converting the first calculation formula by the correction factor, and calculating a corrected dynamic load flow rate value from the measured dynamic load value by the converted first calculation formula.

8. A method according to claim 7, comprising the steps of:

forming the flow passage in a tubular member;

connecting an opening-closing valve member, which opens and closes the downstream end of the tubular member, to the tubular member;

detecting, by the load detector, the dynamic load represented by the downward-flow impact applied to the opening-closing valve member from the particulate material flowing through the flow passage in an open condition of the opening-closing valve member, the load detector being coupled to the tubular member connected to the opening-closing member; and detecting, by the load detector, the static load represented by the load corresponding to the total amount of particulate material deposited within the tubular member during the predetermined time period when the opening-closing valve member is set at its closing position.

9. A method according to claim 7, comprising the steps of:

providing a load-receiving plate member in an inclined manner in the flow passage;

providing a weir or block member at the downstream portion of the load-receiving plate member, the weir member being movable between a block position where the weir member blocks the flow of the particulate material at a position downstream of the load-receiving plate member and an open position where the weir member allows the flow of the particulate material;

measuring, by the load detector, the static load representing the weight of the particulate material having been deposited on the load-receiving plate member in the predetermined time period after the weir member is set to the block position; and setting the weir member to the open position, and measuring, by the load detector, the dynamic load during the time when the particulate material is flowing through the flow passage.

* * * * *